United States Patent
Kareemuddin et al.

(10) Patent No.: US 11,886,310 B2
(45) Date of Patent: Jan. 30, 2024

(54) SYSTEM FOR CLOUD INFRASTRUCTURE VALIDATION FOR SUITABILITY SUBSTANTIATION

(71) Applicant: BANK OF AMERICA CORPORATION, Charlotte, NC (US)

(72) Inventors: Syed Kareemuddin, Hyderabad (IN); Mohammed Abdul Azam, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 29 days.

(21) Appl. No.: 17/392,378

(22) Filed: Aug. 3, 2021

(65) Prior Publication Data
US 2023/0042705 A1    Feb. 9, 2023

(51) Int. Cl.
*G06F 9/44* (2018.01)
*G06F 11/22* (2006.01)
*G06F 8/71* (2018.01)
*H04L 41/0866* (2022.01)

(52) U.S. Cl.
CPC ............ *G06F 11/2247* (2013.01); *G06F 8/71* (2013.01); *H04L 41/0866* (2013.01)

(58) Field of Classification Search
None
See application file for complete search history.

(56) References Cited

U.S. PATENT DOCUMENTS

| | | |
|---|---|---|
| 8,782,434 B1 | 7/2014 | Ghose |
| 9,069,782 B2 | 6/2015 | Yang et al. |
| 9,122,873 B2 | 9/2015 | Ghose |
| 9,606,826 B2 | 3/2017 | Ghosh et al. |
| 9,612,924 B1 | 4/2017 | Joseph et al. |
| 9,979,698 B2 | 5/2018 | Visser et al. |
| 10,061,603 B2 | 8/2018 | Gupta et al. |
| 10,146,639 B1 | 12/2018 | Natanzon et al. |
| 10,228,958 B1 | 3/2019 | Rustad et al. |
| 10,257,167 B1 | 4/2019 | Matthews et al. |
| 10,277,422 B2 | 4/2019 | Chippa et al. |

(Continued)

*Primary Examiner* — Wei Y Zhen
*Assistant Examiner* — Lanny N Ung
(74) *Attorney, Agent, or Firm* — Moore & Van Allen PLLC; Anup Shrinivasan Iyer

(57) ABSTRACT

Systems, computer program products, and methods are described herein for implementing an intelligent validation protocol within a cloud infrastructure. The present invention is configured to receive a request to invoke the intelligent validation protocol on one or more cloud service component clusters; determine one or more operating systems associated with the one or more cloud service component clusters; determine one or more validation requirements for the one or more operating systems; dynamically invoke, using the intelligent validation protocol, a multi-checkpoint validation subroutine on the one or more operating systems; determine whether the one or more operating systems meet the one or more validation requirements; initiate a dashboard script configured to generate an analysis interface indicating whether the one or more operating systems meet the one or more validation requirements; and transmit control signals configured to cause the computing device of the user to display the analysis interface.

14 Claims, 2 Drawing Sheets

(56) References Cited

U.S. PATENT DOCUMENTS

| | | | |
|---|---|---|---|
| 10,291,553 | B2 | 5/2019 | Chippa et al. |
| 10,397,189 | B1 | 8/2019 | Hashmi |
| 10,474,508 | B2 | 11/2019 | Selvaraj |
| 10,552,176 | B1* | 2/2020 | Putney ................. G06F 8/71 |
| 10,579,488 | B2 | 3/2020 | Basur Shankarappa et al. |
| 10,601,779 | B1 | 3/2020 | Matthews et al. |
| 10,922,072 | B1* | 2/2021 | Chouinard ............ G06F 8/656 |
| 10,949,337 | B1* | 3/2021 | Yalla .................. G06N 20/00 |
| 11,003,553 | B2 | 5/2021 | Peng et al. |
| 11,063,829 | B2 | 7/2021 | Smith et al. |
| 2013/0247136 | A1* | 9/2013 | Chieu ................ G06F 21/577 |
| | | | 726/1 |
| 2015/0081875 | A1* | 3/2015 | Ambe ............... G06F 11/3604 |
| | | | 709/224 |
| 2015/0381418 | A1 | 12/2015 | Fausak et al. |
| 2016/0306677 | A1 | 10/2016 | Hira et al. |
| 2016/0308912 | A1* | 10/2016 | Mulgaonkar ........ G06F 21/577 |
| 2018/0081728 | A1 | 3/2018 | Choi et al. |
| 2018/0336124 | A1* | 11/2018 | Malchev ........... G06F 11/3672 |
| 2019/0075115 | A1* | 3/2019 | Anderson ........... H04L 63/102 |
| 2019/0087301 | A1* | 3/2019 | M ..................... H04L 67/131 |

* cited by examiner

SYSTEM FOR CLOUD INFRASTRUCTURE VALIDATION FOR SUITABILITY SUBSTANTIATION

FIELD OF THE INVENTION

The present invention embraces a system for implementing an intelligent validation protocol within a cloud infrastructure.

BACKGROUND

Large scale enterprise cloud infrastructure is home to diverse cloud service component clusters (service offerings) with several versions (or iterations) of operating systems (e.g., server operating systems). Each component of the cloud service component cluster needs to be validated to ensure that the system was installed correctly, is being operated correctly, is performing correctly for its intended use to meet the user requirements, and the environment is being properly maintained with all changes being documented and thoroughly tested.

Therefore, there is a need for a system for implementing an intelligent validation protocol within a cloud infrastructure.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for implementing an intelligent validation protocol within a cloud infrastructure is presented. The system comprising: at least one non-transitory storage device; and at least one processing device coupled to the at least one non-transitory storage device, wherein the at least one processing device is configured to: electronically receive, from a computing device of a user, a request to invoke the intelligent validation protocol on one or more cloud service component clusters within the cloud infrastructure; determine one or more operating systems associated with the one or more cloud service component clusters in response to receiving the request; determine one or more validation requirements for the one or more operating systems; dynamically invoke, using the intelligent validation protocol, a multi-checkpoint validation subroutine on the one or more operating systems; determine whether the one or more operating systems meet the one or more validation requirements based on at least invoking the multi-checkpoint validation subroutine; initiate a dashboard script configured to generate an analysis interface indicating whether the one or more operating systems meet the one or more validation requirements; and transmit control signals configured to cause the computing device of the user to display the analysis interface to the user.

In some embodiments, invoking the multi-checkpoint validation subroutine further comprises: identifying one or more features of the one or more operating systems; and determining whether the one or more features of the one or more operating systems meet the one or more validation requirements.

In some embodiments, the at least one processing device is further configured to: determine that the one or more operating systems are associated with one or more versions; and identify the one or more features of the one or more versions of the one or more operating systems.

In some embodiments, identifying the one or more features of the one or more versions of the one or more operating systems further comprises determining a first portion of the one or more features that are common across the one or more versions of the one or more operating systems.

In some embodiments, identifying the one or more features of the one or more versions of the one or more operating systems further comprises determining a second portion of the one or more features that are unique to each of the one or more versions of the one or more operating systems.

In some embodiments, at least a portion of a second portion of the one or more features are essential to functioning of the one or more operating systems.

In some embodiments, the at least one processing device is further configured to: identify the one or more features of the one or more versions of the one or more operating systems; and determine whether the one or more features of the one or more versions of the one or more operating systems meet the one or more validation requirements.

In some embodiments, the at least one processing device is further configured to: determine one or more cluster types associated with the one or more cloud service component clusters within the cloud infrastructure; and determine the one or more validation requirements for the one or more operating systems based on at least the one or more cluster types.

In some embodiments, the at least one processing device is further configured to: electronically receive, from the computing device of the user, the request to invoke the intelligent validation protocol; initiate an authentication protocol on the computing device of the user in response to receiving the request; and determine, using the authentication protocol, that the user is authorized to invoke the intelligent validation protocol.

In some embodiments, initiating the authentication protocol further comprises: initiating, via the computing device of the user, a request for one or more authentication credentials to the user; receiving, via the computing device of the user, the one or more authentication credentials in response to the request; validating the one or more authentication credentials; and determining that the user is authorized to invoke the intelligent validation protocol.

In some embodiments, validating the one or more authentication credentials further comprises: determining an authorization level of the user based on at least the one or more authentication credentials; determining an authorization requirement associated with invoking the intelligent validation protocol; determining that the authorization level of the user meets the authorization requirement associated with invoking the intelligent validation protocol; and determining that the user is authorized to invoke the intelligent validation protocol based on at least determining that the authorization level of the user meets the authorization requirement associated with invoking the intelligent validation protocol.

In another aspect, a computer program product for implementing an intelligent validation protocol within a cloud infrastructure is presented. The computer program product comprising a non-transitory computer-readable medium comprising code causing a first apparatus to: electronically receive, from a computing device of a user, a request to invoke the intelligent validation protocol on one or more cloud service component clusters within the cloud infrastructure; determine one or more operating systems associated with the one or more cloud service component clusters in response to receiving the request; determine one or more validation requirements for the one or more operating systems; dynamically invoke, using the intelligent validation protocol, a multi-checkpoint validation subroutine on the one or more operating systems; determine whether the one or more operating systems meet the one or more validation requirements based on at least invoking the multi-checkpoint validation subroutine; initiate a dashboard script configured to generate an analysis interface indicating whether the one or more operating systems meet the one or more validation requirements; and transmit control signals configured to cause the computing device of the user to display the analysis interface to the user.

In yet another aspect, a method for implementing an intelligent validation protocol within a cloud infrastructure is presented. The method comprising: electronically receiving, from a computing device of a user, a request to invoke the intelligent validation protocol on one or more cloud service component clusters within the cloud infrastructure; determining one or more operating systems associated with the one or more cloud service component clusters in response to receiving the request; determining one or more validation requirements for the one or more operating systems; dynamically invoking, using the intelligent validation protocol, a multi-checkpoint validation subroutine on the one or more operating systems; determining whether the one or more operating systems meet the one or more validation requirements based on at least invoking the multi-checkpoint validation subroutine; initiating a dashboard script configured to generate an analysis interface indicating whether the one or more operating systems meet the one or more validation requirements; and transmitting control signals configured to cause the computing device of the user to display the analysis interface to the user.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
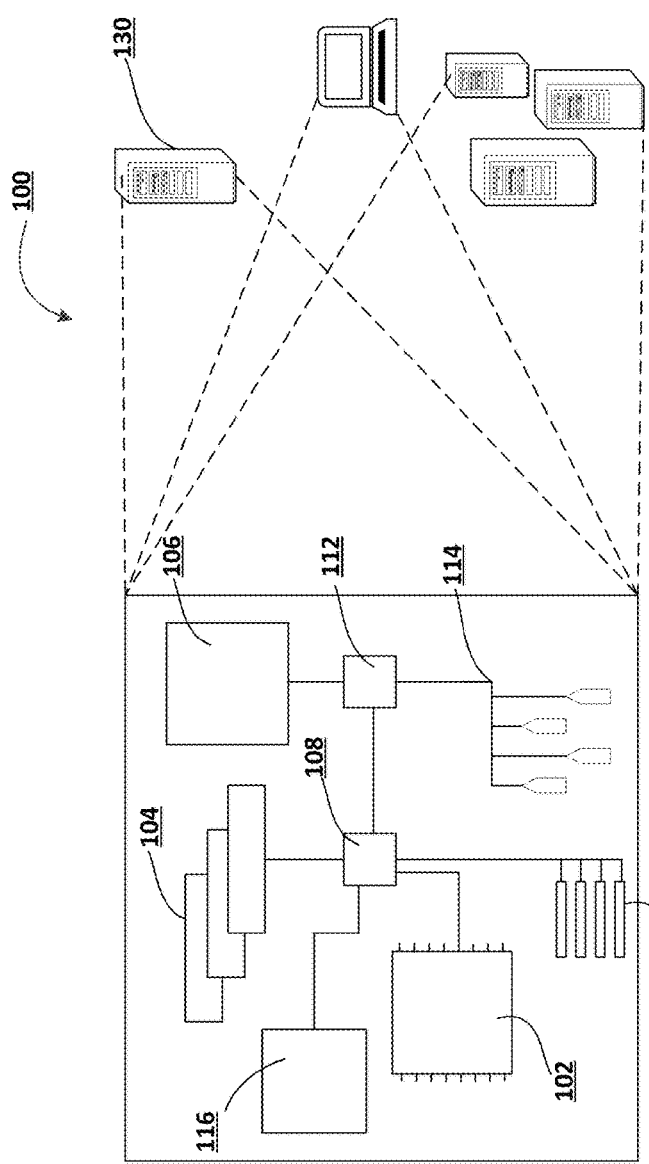
Figure 1:
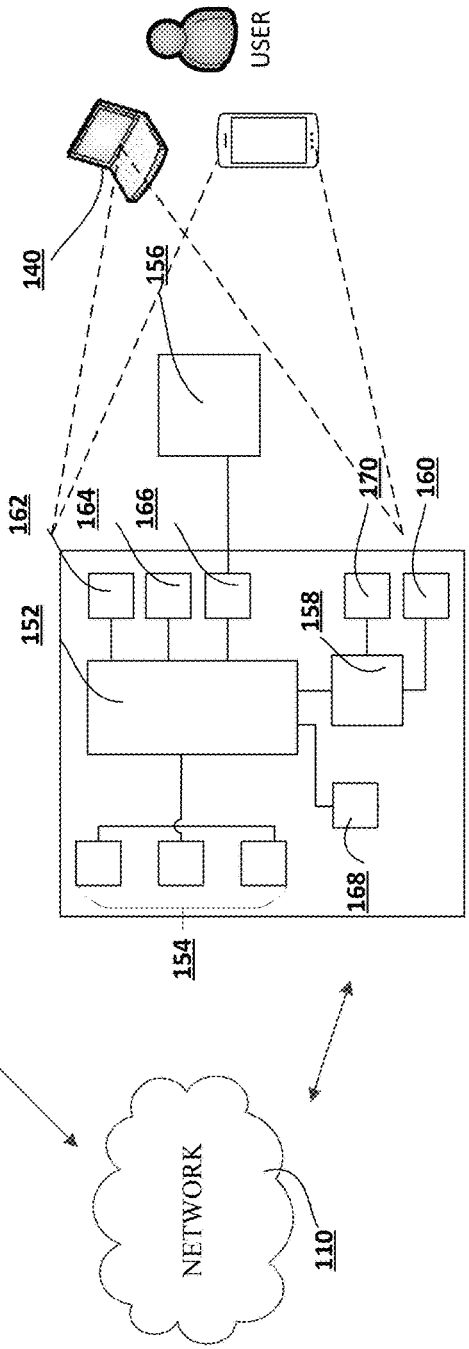
Figure 2:
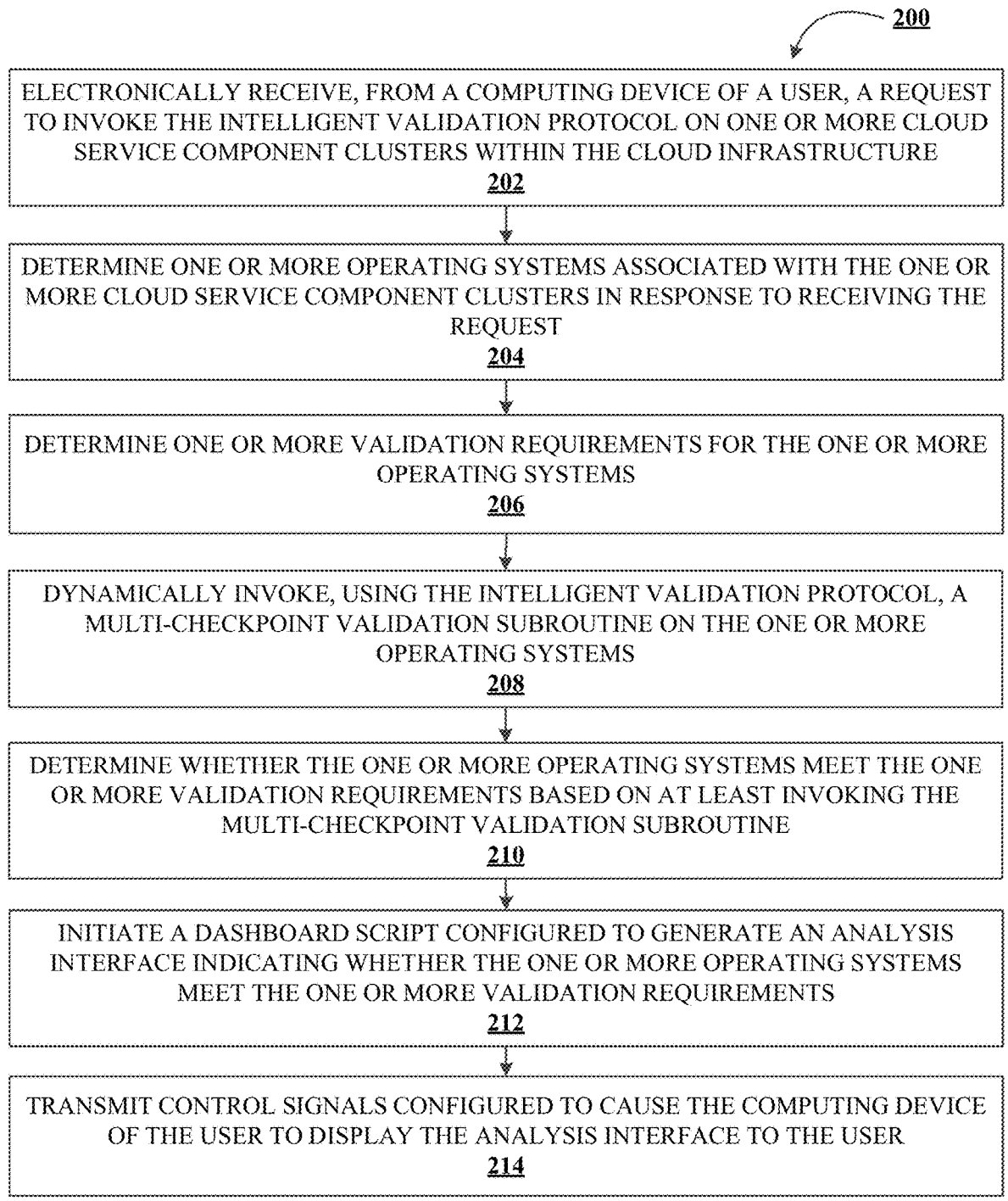

Having thus described embodiments of the invention in general terms, reference will now be made the accompanying drawings, wherein:

FIG. 1 illustrates technical components of a system for implementing an intelligent validation protocol within a cloud infrastructure, in accordance with an embodiment of the invention;

FIG. 2 illustrates a process flow for implementing an intelligent validation protocol within a cloud infrastructure, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "protocol" may refer to core elements of a computer program, or part of a computer program that serves as a foundation for a larger piece of software and drives the functionality of the software. A protocol may be self-contained, but externally-controllable code that encapsulates powerful logic designed to perform or execute a set of rules or procedures or a specific type of function.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

FIG. 1 presents an exemplary block diagram of the system environment for implementing an intelligent validation protocol within a cloud infrastructure 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. In some embodiments, the system 130, and the user input system 140 may be used to implement the processes described herein, in accordance with an embodiment of the present invention. In this regard, the system 130 and/or the user input system 140 may include one or more applications stored thereon that are configured to interact with one another to implement any one or more portions of the various user interfaces and/or process flow described herein.

In accordance with embodiments of the invention, the system 130 is intended to represent various forms of digital computers, such as laptops, desktops, video recorders, audio/video player, radio, workstations, personal digital assistants, servers, wearable devices, Internet-of-things devices, augmented reality (AR) devices, virtual reality (VR) devices, extended reality (XR) devices, automated teller machine devices, electronic kiosk devices, blade servers, mainframes, or any combination of the aforementioned. In accordance with embodiments of the invention, the user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the network 110, a number of other computing devices (not shown) in addition to the user input system 140. In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140 or may also store applications or other information therein. In some embodiments, expansion memory may include instructions to carry out or supplement the processes described above and may include secure information also. For example, expansion memory may be provided as a security module for user input system 140 and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130 via the network 110. Any communication between the system 130 and the user input system 140 (or any other computing devices) may be subject to an authentication protocol allowing the system 130 to maintain security by permitting only authenticated users (or processes) to access the protected resources of the system 130, which may include servers, databases, applications, and/or any of the components described herein. To this end, the system 130 may require the user (or process) to provide authentication credentials to determine whether the user (or process) is eligible to access the protected resources. Once the authentication credentials are validated and the user (or process) is authenticated, the system 130 may provide the user (or process) with permissioned access to the protected resources. Similarly, the user input system 140 (or any other computing devices) may provide the system 130 with permissioned to access the protected resources of the user input system 130 (or any other computing devices), which may include a GPS device, an image capturing component (e.g., camera), a microphone, a speaker, and/or any of the components described herein.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation- and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a technical environment that includes a back end component (e.g., as a data server), that includes a middleware component (e.g., an application server), that includes a front end component (e.g., a client computer having a graphical user interface or a Web browser through which a user can interact with an implementation of the systems and techniques described here), or any combination of such back end, middleware, or front end components.

As shown in FIG. 1, the components of the system 130 and the user input system 140 are interconnected using the network 110. The network 110, which may be include one or more separate networks, be a form of digital communication network such as a telecommunication network, a local area network ("LAN"), a wide area network ("WAN"), a global area network ("GAN"), the Internet, or any combination of the foregoing. It will also be understood that the network 110 may be secure and/or unsecure and may also include wireless and/or wired and/or optical interconnection technology.

In accordance with an embodiments of the invention, the components of the system environment 100, such as the system 130 and the user input system 140 may have a client-server relationship, where the user input system 130 makes a service request to the system 130, the system 130 accepts the service request, processes the service request, and returns the requested information to the user input system 140, and vice versa. This relationship of client and server typically arises by virtue of computer programs running on the respective computers and having a client-server relationship to each other.

It will be understood that the embodiment of the system environment 100 illustrated in FIG. 1 is exemplary and that other embodiments may vary. As another example, in some embodiments, the system environment may include more, fewer, or different components. As another example, in some embodiments, some or all of the portions of the system environment 100 may be combined into a single portion. Likewise, in some embodiments, some or all of the portions of the system 130 may be separated into two or more distinct portions.

Large scale enterprise cloud infrastructure is home to diverse cloud service component clusters (service offerings) with several versions (or iterations) of operating systems (e.g., server operating systems). Each component of the cloud service component cluster needs to be validated to ensure that the system was installed correctly, is being operated correctly, is performing correctly for its intended use to meet the user requirements, and the environment is being properly maintained with all changes being documented and thoroughly tested. To validate various versions of operating systems in the cluster, entities often employ a validation strategy whereby common requirements for the various versions are identified and checked against the features of the operating systems. However, this method of validation tends to ignore version-specific features that are otherwise necessary for seamless operation. There is an inherent complexity in validating version-specific operating systems across the cloud infrastructure. The present invention provides the functional benefit of implementing an intelligent validation protocol within a cloud infrastructure that dynamically invokes specific requirement checks pertaining to specific versions of operating systems in conjunction with requirement checks that are common across all versions of the same operating systems. The results of the check are then intelligently assessed and grouped together in the form of a dashboard report that allows the user to review and perform appropriate actions to ensure that new server build/rebuilds meet the operational standards. The unique aspect of the present invention, among other features, lies in the complexity and completeness of the validation protocol and in its vendor agnostic form.

FIG. 2 illustrates a process flow for implementing an intelligent validation protocol within a cloud infrastructure 200, in accordance with an embodiment of the invention. As shown in block 202, the process flow includes electronically receiving, from a computing device of a user, a request to invoke the intelligent validation protocol on one or more cloud service component clusters within the cloud infrastructure. Cloud service component clusters may include of all hardware and software components that are needed to support the delivery of cloud services to the customer. In some embodiments, the user may invoke the intelligent validation protocol on the one or more cloud service component clusters to perform component specific validation such as server details validation in configuration management database (CMDB)/system of record (SOR), domain login access validation, server, server Internet Control Message Protocol (ICMP) validation. In some embodiments, cloud service component clusters may refer to a wide range of services delivered on demand to entities and/or customers over the Internet. These services are designed to provide access to applications and resources, without the need for internal infrastructure or hardware. Each cloud service component cluster may be associated with a cluster type. In some embodiments, each cluster type may be associated with a predetermined cluster configuration. Each cluster configuration may include specific operating systems. In such cases, the intelligent validation protocol may be configured to validate the one or more cloud service component clusters within the cloud infrastructure based on the specific cluster type.

In some embodiments, the system may be configured to initiate an authentication protocol on the computing device of the user in response to receiving the request. In this regard, the system may be configured to initiate, via the computing device of the user, a request for one or more authentication credentials to the user. In response, the system may be configured to receive, via the computing device of the user, the one or more authentication credentials in response to the request. Once the authentication credentials are received, the system may be configured to validate the one or more authentication credentials. In this regard, the system may be configured to determine an authorization level of the user based on at least the one or more authentication credentials. In addition, the system may be configured to determine an authorization requirement associated with invoking the intelligent validation protocol. In response, the system may be configured to determine that the authorization level of the user meets the authorization requirement associated with invoking the intelligent validation protocol. Accordingly, the system may be configured to determine that the user is authorized to invoke the intelligent validation protocol. Based on successful validation, the system may be configured to determine, using the authentication protocol, that the user is authorized to invoke the intelligent validation protocol.

Next, as shown in block 204, the process flow includes determining one or more operating systems associated with the one or more cloud service component clusters in response to receiving the request. As used herein, "operating system" may refer to a system software that manages server hardware, software resources, and provides common services for server applications and programs within a cloud infrastructure.

Next, as shown in block 206, the process flow includes determining one or more validation requirements for the one or more operating systems. In embodiments where the cloud service component clusters are associated with one or more cluster types, the system may be configured to determine the one or more validation requirements for the one or more operating systems based on at least the one or more cluster types.

Next, as shown in block 208, the process flow includes dynamically invoking, using the intelligent validation protocol, a multi-checkpoint validation subroutine on the one or more operating systems. In this regard, the system may be configured to identify one or more features of the one or more operating systems. In some embodiments, the one or more operating systems may be associated with one or more versions. In one aspect, as part of identifying the one or more features of the one or more operating systems, the system may be configured to determine a first portion of the one or more features that are common across the one or more versions of the one or more operating systems. In another aspect, as part of identifying the one or more features of the one or more operating systems, the system may be configured to determine a second portion of the one or more features that are unique to each of the one or more versions of the one or more operating systems. In some embodiments, at least a portion of a second portion of the one or more features are essential to functioning of the one or more operating systems.

In some embodiments, as part of identifying the features of the operating systems, the system may be configured to capture relevant information from one or more associated components. Accordingly, for example, the system may be configured to capture information associated with the following to identify the features—multi-threading capacity, network interface card (NIC) redundancy, network protocols, associated physical switches, network components enabling virtual machine migration, version checks, syslogs, drivers, disk group status, firmware status, resynchronizing throttling, de-duplication, compression, licensing requirements, port access, access validations, certificate expiry, distributed resource scheduling, admission control, alert monitoring, hardware virtualization capacity, and/or the like.

Next, as shown in block 210, the process flow includes determining whether the one or more operating systems meet the one or more validation requirements based on at least invoking the multi-checkpoint validation subroutine. In this regard, the system may be configured to determine whether the one or more features of the one or more operating systems meet the one or more validation requirements. In embodiments where the one or more operating systems are associated with one or more versions, the system may be configured to identify the one or more features of the one or more versions of the one or more operating systems.

In response, the system may be configured to determine whether the one or more features of the one or more versions of the one or more operating systems meet the one or more validation requirements.

Next, as shown in block 212, the process flow includes initiating a dashboard script configured to generate an analysis interface indicating whether the one or more operating systems meet the one or more validation requirements. In some embodiments, for features that meet, i.e., completely fulfil, or satisfy the validation requirements, the system may be configured to generate a positive acknowledgement indicating as such. In some embodiments, for features that do not meet the validation requirements, the system may be configured to generate an alert indicating as such. In this way, the system may be configured to generate the analysis interface with features that both meet the requirements and features that do not meet the requirements.

Next, as shown in block 214, the process flow includes transmitting control signals configured to cause the computing device of the user to display the analysis interface.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, PowerShell, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for implementing an intelligent validation protocol within a cloud infrastructure, the system comprising:
    at least one non-transitory storage device; and
    at least one processing device coupled to the at least one non-transitory storage device, wherein the at least one processing device is configured to:
    electronically receive, from a computing device of a user, a request to invoke the intelligent validation protocol on one or more cloud service component clusters within the cloud infrastructure, wherein the one or more cloud service component clusters provide access to applications and resources without a need for internal infrastructure or hardware;
    determine one or more operating systems associated with the one or more cloud service component clusters in response to receiving the request;
    determine one or more validation requirements for the one or more operating systems;
    determine one or more versions of the one or more operating systems;
    identify one or more features of the one or more versions of the one or more operating systems, wherein identifying the one or more features comprises capturing relevant information from one or more components associated with the one or more cloud service component clusters, wherein the relevant information comprises at least multi-threading capacity, network interface card (NIC) redundancy, network protocols, associated physical switches, network components enabling virtual machine migration, version checks, syslogs, drivers, disk group status, firmware status, resynchronizing throttling, de-duplication, compression, licensing requirements, port access, access validations, certificate expiry, distributed resource scheduling, admission control, alert monitoring, and hardware virtualization capacity;
    determine a second portion of the one or more features that are unique to each of the one or more versions of the one or more operating systems, wherein the second portion of the one or more features that are unique to each of the one or more versions are essential to a functioning of the one or more versions of the one or more corresponding operating systems;
    dynamically invoke, using the intelligent validation protocol, a multi-checkpoint validation subroutine on the one or more features of the one or more versions of the one or more operating systems;
    determine whether the one or more features of the one or more versions of the one or more operating systems meet the one or more validation requirements based on at least invoking the multi-checkpoint validation subroutine;
    initiate a dashboard script configured to generate an analysis interface indicating whether the one or more features of the one or more versions of the one or more operating systems meet the one or more validation requirements; and
    transmit control signals configured to cause the computing device of the user to display the analysis interface to the user.

2. The system of claim 1, wherein identifying the one or more features of the one or more versions of the one or more operating systems further comprises determining a first portion of the one or more features that are common across the one or more versions of the one or more operating systems.

3. The system of claim 1, wherein the at least one processing device is further configured to:
    determine one or more cluster types associated with the one or more cloud service component clusters within the cloud infrastructure; and
    determine the one or more validation requirements for the one or more operating systems based on at least the one or more cluster types.

4. The system of claim 1, wherein the at least one processing device is further configured to:
    electronically receive, from the computing device of the user, the request to invoke the intelligent validation protocol;
    initiate an authentication protocol on the computing device of the user in response to receiving the request; and
    determine, using the authentication protocol, that the user is authorized to invoke the intelligent validation protocol.

5. The system of claim 4, wherein initiating the authentication protocol further comprises:
    initiating, via the computing device of the user, a request for one or more authentication credentials to the user;
    receiving, via the computing device of the user, the one or more authentication credentials in response to the request;
    validating the one or more authentication credentials; and
    determining that the user is authorized to invoke the intelligent validation protocol.

6. The system of claim 5, wherein validating the one or more authentication credentials further comprises:
    determining an authorization level of the user based on at least the one or more authentication credentials;
    determining an authorization requirement associated with invoking the intelligent validation protocol;
    determining that the authorization level of the user meets the authorization requirement associated with invoking the intelligent validation protocol; and
    determining that the user is authorized to invoke the intelligent validation protocol based on at least determining that the authorization level of the user meets the authorization requirement associated with invoking the intelligent validation protocol.

7. A computer program product for implementing an intelligent validation protocol within a cloud infrastructure, the computer program product comprising a non-transitory computer-readable medium comprising code causing a first apparatus to:

electronically receive, from a computing device of a user, a request to invoke the intelligent validation protocol on one or more cloud service component clusters within the cloud infrastructure, wherein the one or more cloud service component clusters provide access to applications and resources without a need for internal infrastructure or hardware;

determine one or more operating systems associated with the one or more cloud service component clusters in response to receiving the request;

determine one or more validation requirements for the one or more operating systems;

determine one or more versions of the one or more operating systems;

identify one or more features of the one or more versions of the one or more operating systems, wherein identifying the one or more features comprises capturing relevant information from one or more components associated with the one or more cloud service component clusters, wherein the relevant information comprises at least multi-threading capacity, network interface card (NIC) redundancy, network protocols, associated physical switches, network components enabling virtual machine migration, version checks, syslogs, drivers, disk group status, firmware status, resynchronizing throttling, de-duplication, compression, licensing requirements, port access, access validations, certificate expiry, distributed resource scheduling, admission control, alert monitoring, and hardware virtualization capacity;

determine a second portion of the one or more features that are unique to each of the one or more versions of the one or more operating systems, wherein the second portion of the one or more features that are unique to each of the one or more versions are essential to a functioning of the one or more versions of the one or more corresponding operating systems;

dynamically invoke, using the intelligent validation protocol, a multi-checkpoint validation subroutine on the one or more features of the one or more versions of the one or more operating systems;

determine whether the one or more features of the one or more versions of the one or more operating systems meet the one or more validation requirements based on at least invoking the multi-checkpoint validation subroutine;

initiate a dashboard script configured to generate an analysis interface indicating whether the one or more features of the one or more versions of the one or more operating systems meet the one or more validation requirements; and transmit control signals configured to cause the computing device of the user to display the analysis interface to the user.

8. The computer program product of claim 7, wherein identifying the one or more features of the one or more versions of the one or more operating systems further comprises determining a first portion of the one or more features that are common across the one or more versions of the one or more operating systems.

9. The computer program product of claim 7, wherein the first apparatus is further configured to:

determine one or more cluster types associated with the one or more cloud service component clusters within the cloud infrastructure; and determine the one or more validation requirements for the one or more operating systems based on at least the one or more cluster types.

10. A method for implementing an intelligent validation protocol within a cloud infrastructure, the method comprising:

electronically receiving, from a computing device of a user, a request to invoke the intelligent validation protocol on one or more cloud service component clusters within the cloud infrastructure, wherein the one or more cloud service component clusters provide access to applications and resources without a need for internal infrastructure or hardware;

determining one or more operating systems associated with the one or more cloud service component clusters in response to receiving the request;

determining one or more validation requirements for the one or more operating systems;

determining one or more versions of the one or more operating systems;

identifying one or more features of the one or more versions of the one or more operating systems, wherein identifying the one or more features comprises capturing relevant information from one or more components associated with the one or more cloud service component clusters, wherein the relevant information comprises at least multi-threading capacity, network interface card (NIC) redundancy, network protocols, associated physical switches, network components enabling virtual machine migration, version checks, syslogs, drivers, disk group status, firmware status, resynchronizing throttling, de-duplication, compression, licensing requirements, port access, access validations, certificate expiry, distributed resource scheduling, admission control, alert monitoring, and hardware virtualization capacity;

determining a second portion of the one or more features that are unique to each of the one or more versions of the one or more operating systems, wherein the second portion of the one or more features that are unique to each of the one or more versions are essential to a functioning of the one or more versions of the one or more corresponding operating systems;

dynamically invoking, using the intelligent validation protocol, a multi-checkpoint validation subroutine on the one or more features of the one or more versions of the one or more operating systems;

determining whether the one or more features of the one or more versions of the one or more operating systems meet the one or more validation requirements based on at least invoking the multi-checkpoint validation subroutine;

initiating a dashboard script configured to generate an analysis interface indicating whether the one or more features of the one or more versions of the one or more operating systems meet the one or more validation requirements; and transmitting control signals configured to cause the computing device of the user to display the analysis interface to the user.

11. The method of claim 10, wherein identifying the one or more features of the one or more versions of the one or more operating systems further comprises determining a first portion of the one or more features that are common across the one or more versions of the one or more operating systems.

12. The method of claim 10, wherein the method further comprises:
- determining one or more cluster types associated with the one or more cloud service component clusters within the cloud infrastructure; and
- determining the one or more validation requirements for the one or more operating systems based on at least the one or more cluster types.

13. The method of claim 10, wherein the method further comprises:
- electronically receiving, from the computing device of the user, the request to invoke the intelligent validation protocol;
- initiating an authentication protocol on the computing device of the user in response to receiving the request; and
- determining, using the authentication protocol, that the user is authorized to invoke the intelligent validation protocol.

14. The method of claim 13, wherein initiating the authentication protocol further comprises:
- initiating, via the computing device of the user, a request for one or more authentication credentials to the user;
- receiving, via the computing device of the user, the one or more authentication credentials in response to the request;
- validating the one or more authentication credentials; and
- determining that the user is authorized to invoke the intelligent validation protocol.

* * * * *